US008940073B2

(12) United States Patent
Schmidt

(10) Patent No.: US 8,940,073 B2
(45) Date of Patent: Jan. 27, 2015

(54) FILTER MATERIAL FOR CLEANING AIR AND GASES

(75) Inventor: Andreas Schmidt, Duderstadt (DE)

(73) Assignee: McAirlaid's Vliesstoffe GmbH, Berlingerode (DE)

( * ) Notice: Subject to any disclaimer, the term of this patent is extended or adjusted under 35 U.S.C. 154(b) by 492 days.

(21) Appl. No.: 13/262,632

(22) PCT Filed: Mar. 29, 2010

(86) PCT No.: PCT/DE2010/075030
§ 371 (c)(1),
(2), (4) Date: Oct. 17, 2011

(87) PCT Pub. No.: WO2010/112024
PCT Pub. Date: Oct. 7, 2010

(65) Prior Publication Data
US 2012/0167771 A1  Jul. 5, 2012

(30) Foreign Application Priority Data
Apr. 3, 2009  (DE) .................. 10 2009 016 148

(51) Int. Cl.
*B01D 46/00* (2006.01)
*B01D 39/18* (2006.01)

(52) U.S. Cl.
CPC . *B01D 39/18* (2013.01); *Y10S 55/05* (2013.01)
USPC .................. 55/528; 55/486; 55/521; 55/527; 55/DIG. 5; 131/340

(58) Field of Classification Search
USPC ........ 131/340; 55/486, 521, 527, 528, DIG. 5
See application file for complete search history.

(56) References Cited

U.S. PATENT DOCUMENTS

| | | | | |
|---|---|---|---|---|
| 4,274,428 A | * | 6/1981 | Muller et al. ................. | 131/331 |
| 4,784,892 A | * | 11/1988 | Storey et al. ................. | 428/172 |
| 5,045,094 A | * | 9/1991 | Paranjpe ........................ | 95/273 |
| 5,053,066 A | * | 10/1991 | Hassenboehler .............. | 55/521 |
| 5,396,909 A | * | 3/1995 | Gentry et al. ................. | 131/332 |
| 5,652,041 A | * | 7/1997 | Buerger et al. ............... | 428/198 |
| 6,257,242 B1 | * | 7/2001 | Stavridis ....................... | 131/344 |
| 6,675,702 B1 | * | 1/2004 | Maksimow .................... | 100/41 |
| 8,070,858 B2 | * | 12/2011 | Schultink et al. .............. | 95/287 |
| 8,152,879 B2 | * | 4/2012 | Schultink et al. .............. | 55/382 |
| 8,512,432 B2 | * | 8/2013 | Jones et al. .................... | 55/487 |
| 2009/0031683 A1 | | 2/2009 | Schultink et al. | |
| 2009/0211211 A1 | | 8/2009 | Schultink et al. | |
| 2009/0266233 A1 | | 10/2009 | Schultink et al. | |

FOREIGN PATENT DOCUMENTS

| | | |
|---|---|---|
| CA | 2309998 B | 5/1999 |
| DE | 1168309 B | 4/1964 |
| DE | 19750890 A1 | 5/1999 |
| DE | 19803837 A1 | 8/1999 |

(Continued)

OTHER PUBLICATIONS

Machine translation of DE 1168309 published on Apr. 16, 1964.*

*Primary Examiner* — Robert Clemente
(74) *Attorney, Agent, or Firm* — Gudrun E. Huckett

(57) ABSTRACT

The invention relates to a filter material for cleaning air and gases, comprising a fiber layer (2) made of cellulose fibers bonded to each other in segments by pressing, thus compacting the cellulose fibers in the pressed areas (4).

17 Claims, 3 Drawing Sheets

(56) References Cited

FOREIGN PATENT DOCUMENTS

| DE | 19824825 | A1 | 12/1999 |
|---|---|---|---|
| EP | 1032283 | B1 | 9/2000 |
| EP | 1032342 | B1 | 7/2001 |
| EP | 1795247 | A1 | 6/2007 |
| WO | 99/25281 | A1 | 5/1999 |
| WO | 2007/118640 | A2 | 10/2007 |

* cited by examiner

FILTER MATERIAL FOR CLEANING AIR AND GASES

BACKGROUND OF THE INVENTION

The present invention concerns a filter material for cleaning air and gases, a filter for cleaning air and gases, as well as the use of the filter material in cigarette filters and dedusting and gas cleaning devices.

Filter materials for cleaning air and gases, for short referred to as gas filters, are used in order to remove undesirable suspended particles such as pathogenic germs, pollen, dust or foreign gases from the air or the gas. Important fields of use are dust-emitting industries such as the paper industry and cement industry, use in ventilation devices in order to keep away pollutants from living and working spaces, in vacuum cleaning devices in order to filter the exiting air.

A further field of application is the use as filters in tobacco products, e.g., in cigarettes. The cigarette filter is designed to reduce the proportion of health-hazardous substances such as condensate and gases in the smoke of the cigarette. Moreover, by means of the filter the smoke is becoming somewhat milder so that some smokers remove or shorten it for a more intensive taste. In a classic filter cigarette the filter is enveloped by a cork-colored mouth piece in order to prevent that the brown discoloration of the filter becomes visible. Most industrially manufactured cigarettes are provided with a filter; smokers who make their own cigarettes can buy them in a tobacco shop.

The basic material for producing prior art cigarette filters is cellulose acetate. Cellulose acetate is existing in the form of threads that have a diameter between 30 and 50 µm. They are combined/bundled to an endless band and are spot-wise glued with triacetine. Such a cigarette filter can retain particles up to a diameter of less than 0.2 µm.

The cellulose acetate that is employed in cigarette filters is obtained by chemical modification of cellulose. It is an inexpensive material that also is easy to process. By the chemical modification of the cellulose to cellulose acetate, the fibers are no longer usable as a food basis for microorganisms, i.e., it is resistant with regard to mold, fungi or bacteria attack, but at the same time is also difficult to decompose biologically. The chemical resistance is a disadvantage in connection with cigarette filters because they will decompose or degrade only slowly. Cigarette stubs that are disposed of, i.e., thrown away, in nature remain unchanged for a long period of time and are visible as litter.

European patent EP 1 032 283 discloses a filter cigarette with a biologically decomposable filter. The filter contained in this filter cigarette contains an uncrimped cellulose nonwoven, produced by the "airlaid" process, with normal retention performance and a filter ventilation zone that extends in circumferential direction. This cigarette is supposed to deliver the acetate-typical taste impression and also the acetate-typical visual appearance. In order to obtain these goals, the cigarette must have a specific configuration as disclosed in EP 1 032 283.

Filter materials are however not only important with regard to tobacco products. In industry and in the household there is always the need for new and inexpensive filter materials with which undesirable suspended particles such as pathogenic germs, pollen, dust or gases are to be removed from the exhaust air or, as in case of ventilation devices of living and business spaces, in order to keep pollutants from entering these spaces.

The invention has therefore the object to provide a filter material that combines the advantages of a good filter action with the advantage of being biologically decomposable.

SUMMARY OF THE INVENTION

As a solution of this object, a filter material is proposed that comprises a fiber layer of pulp fibers that, across partial areas thereof, by a pressing action with compression of the pulp fibers are connected with each other in the pressed areas. Due to this pressing action on the pulp fibers the cellulose/pulp is imparted with a certain strength without reducing the permeability for gaseous substances in the areas not subjected to the pressing action. An improved filter action was observed. The cellulose or the cellulose fibers from which the filter material is produced are inexpensive and commercially available materials. Also, they can be processed easily.

The filter material according to the invention contains as an important ingredient a natural material, cellulose or pulp, that is substantially existing in the form of non-uniformly arranged fibers. Preferably, cellulose fibers are used that are present in the form of nonwoven material, in particular as airlaid nonwovens. Nonwoven materials or nonwovens belong to the textile composite materials; they are flexible porous flat web structures that are produced by plaiting and/or cohesive and/or adhesive connection of the fibers. The nonwovens are loose materials of fibers whose cohesion is generally provided by the inherent adhesion of the fibers. The nonwovens, as needed, can be strengthened wherein for the use in the present invention mechanical strengthening with omission of binding agents is preferred.

Biologically decomposable means in the context of the present invention that the individual ingredients can be decomposed by microorganisms, in the presence of oxygen, into carbon dioxide, water, and salts of other elements that are present (mineralization) with formation of new biomass or, in the absence of oxygen, into carbon dioxide, methane, mineral salts and new biomass, wherein the material should comply with the European standard EN 13432 "Requirements for packagings recoverable through composting and biodegradation". According to this standard after composting for a duration of at most 12 weeks maximally 10% of the original dry weight of the tested material, i.e., the starting material, should be found in a >2 mm screening fraction.

In a possible embodiment, the filter material, in addition to the fiber layer of compressed pulp fibers, has a further layer at least on one flat side. It is also possible that the filter material on both flat sides has further layers wherein these further layers may be of the same material or materials that are different from each other. The materials that can be used for these further layers can be, for example, tissue, textile, nonwoven-like and/or film-like materials. Preferably, the material for the additional layer or the additional layers is also made of cellulose or a plastic material that is biologically well decomposable. The further layer(s) increase the strength of the filter material and facilitate thus processing on the high-speed machines.

In one embodiment of the present invention it is proposed that the pulp fibers and the optionally existing further layer(s) in the pressed areas are pressed with heat application.

In one possible embodiment, the fiber layer and the further layer are also connected to each other only across partial areas thereof by pressing action with heat application. The production of such pulp fibers and fiber layers or webs connected to each other is disclosed in an exemplary fashion in German patent applications DE 19824825, DE 19803837, DE 19750890 and European patent EP 1032342.

It has been found that by the use of the pulp fibers, pressed only across partial areas thereof, as a filter material an excellent filter action, i.e. retention action for the suspended particles and gases to be removed, can be achieved. It is assumed that this action is achieved in that the individual pressed areas change the surface or the flow-through of the gas or air to be purified in such a way that the suspended particles are retained. A further reason could be that by the pressing action a different, particularly advantageous surface structure is obtained on the flat side of the filter material.

In a possible configuration of the present invention the surface structure of the filter material can be varied in that the flat filter material can be folded, laid and/or curled such that it is imparted with a curled or corrugated appearance, i.e., in the direction of folding/laying/curling the extension of the flat structure is shortened. This curling or folding can be done uniformly or non-uniformly. This type of structural change is referred to in some cases also as creping or crimping.

The filter material according to the invention is usually existing as a quasi two-dimensional layer whose filter action can be utilized in various ways.

For use as an air or gas filter it has been found to be especially suitable when the two-dimensional flat web structure of the fiber layer and optionally existing further layer is present in the form of a fiber web that can be optionally crimped and which is wound and alternatingly laid with formation of passages that extend in the longitudinal direction of the air/gas stream to be purified. The air to be purified or the gas to be purified in such an embodiment can enter at one side of the filter material and passes thus through the formed passages and also the area of the fiber layers that are not pressed. Based on the folding or laying of the filter material the size (diameter) of the passages that are thus formed can be adjusted. The adjustment of the size of these passages is the simpler the thinner the layer of filter material. On the other hand, the thickness of the pulp fibers that are only partially pressed should not be too small because then the strength of the filter material is insufficient for processing into a filter. The layer thickness of the filter material is preferably from 0.3 to 1.8 mm.

The inventors assume that the good filter action is produced in that the air or gas streams to be purified pass through different filter spaces. A further effect on the filter action appears to be caused by the embossed areas because in these areas the surface structure of the fiber layer changes. The filter material according to the invention is suitable accordingly also for use in dedusting and gas cleaning devices and also as filter material in tobacco products.

The filter material used in accordance with the invention has usually a weight per surface area between 15 g/m² and 600 g/m², preferably between 20 g/m² and 200 g/m². The filter efficiency of the filter according to the invention can be increased by additives. These additives can be, for example, absorption agents or also flavor additives, aroma additives or further auxiliary substances. The absorption agents can be, for example, selected from active carbon, zeolites, silicates and/or $SiO_2$. The absorption agents are characterized by a high surface area and a high absorption efficiency. As further additives with a retention action for pollutants, organic acids and their salts, metals or metal oxides, nitrogen components, ion exchange systems, alcohols, polyphenyls and porphyrin derivatives can be used.

Depending on the field of application, in addition to the absorption agents also scent additives, flavor additives and aroma additives as well as further auxiliary substances that improve the taste and the tolerance of the cigarette such as menthol, oil of cloves, vanilla and comparable substances may be contained.

The addition of additives can be realized by strewing or spraying onto the filter materials, e.g., onto the fibers, before or after the pressing action but also by direct injection into the filter strand.

A further object of the present invention is a filter for cleaning gases and/or air which comprises the afore described filter material.

A further object of the present invention is a filter for cigarettes that comprises the afore described filter material.

For use in cigarette filters, the filter material that is generally existing in the form of a flat web material can be brought, as is known in the art, into a preferable cylindrical shape. In one possible embodiment, the filter material is surrounded by an envelope layer. This envelope layer can serve to secure the filter material in its shape but it can also be a conventional cigarette paper.

In the embodiment as a cigarette filter, the filter material can adjoin directly the tobacco area of the cigarette. In one possible embodiment, the filter, at the end where the smoke will enter coming from the tobacco side, can be provided with a further filter material. This further filter material can be conventional materials that are used in filter cigarettes, for example, active carbon, cellulose acetate or other filter materials known in the art.

In a further possible embodiment, the cigarette filter contains, in addition to the filter material according to the invention, also a supplemental material which is arranged at the end where the smoke exits, i.e., at the mouthpiece end. It can be, for example, further filter material or a material that is supposed to influence the visual appearance of the filter at the filter-side end of the cigarette.

In one possible embodiment, the envelope layer contains ventilation holes. The production of ventilation holes is known to a person of skill in the art.

BRIEF DESCRIPTION OF THE DRAWINGS

The invention is described in the attached figures with the aid of an embodiment in more detail. It is shown in.

DESCRIPTION OF PREFERRED EMBODIMENTS

Figure 1:
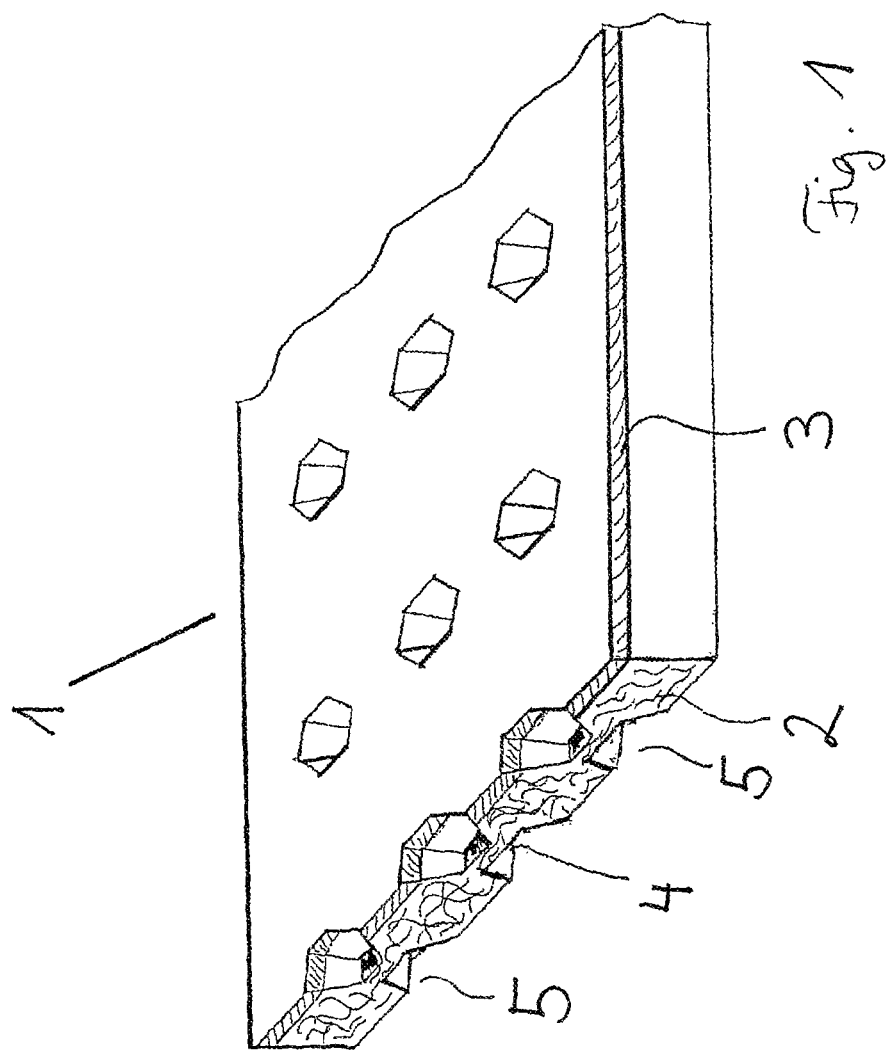
FIG. 1 a perspective illustration of the filter material with two layers.

FIG. 1 shows in perspective enlarged illustration the filter material according to the invention. The thickness is illustrated excessively large. The filter material 1 comprises in the illustrated embodiment two layers, one fiber layer 2 and a further layer 3.

The lower significantly thicker layer is a fiber layer 2 of pulp fibers, optionally containing additives. The layer 2 is preferably produced by an airlaid method from cellulose material. Such cellulose material is available inexpensively as mass-produced material. In the production by a continuous airlaid process the fiber web material is produced from loosely placed material of pulp fibers of pulp (fluff pulp) layered in an air stream and optionally strewn in absorber materials. For producing a standardized product, renewable wood raw material available on the market can be used.

The process of pulp layering in an air stream as a starting material for the fiber layer 1 enables dry processing of the pulp fibers and thus upon subsequent connection with the additional layer an excellent compression of the pulp fibers in individual, i.e., discrete embossed areas 4. Outside of such embossed areas 4 the fibers are loosely resting on each other; this, in these zones, improves the absorption capability/filter action and the flexibility of the layer 1.

The further layer 3 is significantly thinner than the fiber layer 2. The layer 3 can be, for example, formed of a web of textile, nonwoven-like or film-like material.

Connecting the two layers 2, 3 is realized, for example, by an embossment method. This provides a pressing action across partial areas causing compression of the pulp fibers of the fiber layer 2.

The pressing action is not uniform across large surface areas but a pressing action is realized mainly in the embossed areas 4 so that depressions 5 in the fiber layer 2 are formed. The depressions 5 in the embossed areas 4 can be round or polygonal. In the illustrated embodiment, they have the shape of truncated pyramids or truncated cones.

Because of the thin wall structure of the further layer 3, the embossment pattern that is produced by the pressing action is also visible on the exterior side of the layer 3.

The embossment is realized by means of two rollers of which one is provided with a structure that forms the depressions 5. In this way, in the discrete embossed areas 4 a compression of the pulp fibers is achieved. Outside of the embossed areas 4 the fibers are resting loosely on each other which improves the absorption capability and flexibility of the material. When producing the fiber material of this example, neither adhesives nor other binding agents such as latex, are required. Instead, the connection is purely thermo-mechanical. By means of the targeted arrangement as well as the number and size of the embossed areas, the flow-through of the gases and thus also partially the filter action can be controlled.

The weight per surface area of the fiber layer 2 can be between 15 g/m$^2$ and 600 g/m$^2$. Preferably, the weight per surface area is between 20 g/m$^2$ and 200 g/m$^2$. The weight per surface area of the additional layer 3 is in general somewhat less than the weight per surface area of the fiber layer 2 and is preferably between 15 and 30 g/m$^2$.

Figure 2:
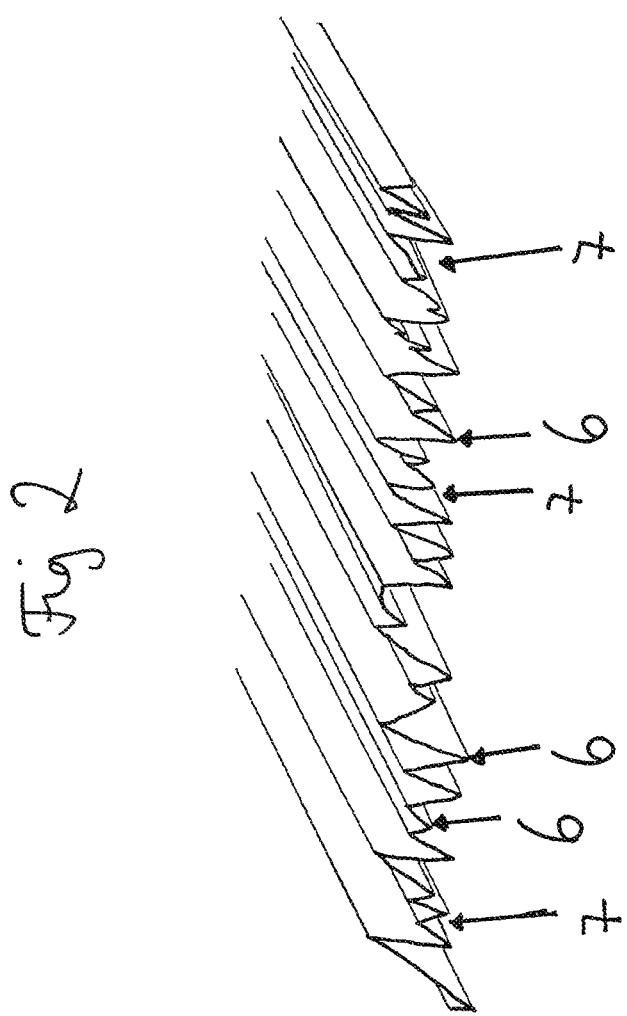
FIG. 2 a section of the filter material in the crimped state.

FIG. 2 shows a section of the material web 1 in the crimped state. The individual layers are not illustrated here. In the illustrated embodiment, the material is folded in an irregular pattern into folds. A filter material is obtained that in addition to the embossed areas 4 has a surface structure with projections 6 and further depressions 7. With these projections and depressions an enlargement of the surface area is achieved.

Figure 3:
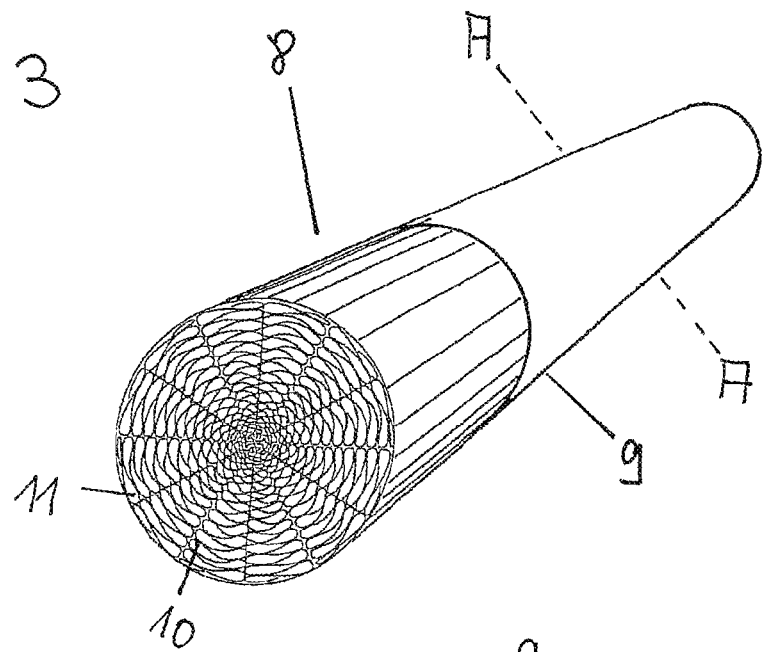
FIG. 3 a perspective view of a filter with partial removal of the envelope layer.

In FIG. 3 a filter 8 according to the invention is illustrated, comprised of the filter material, illustrated in FIG. 1 and existing as a flat web material, and an envelope layer 9 which is partially removed in the illustration. The filter material 1 in the embodiment illustrated here is alternatingly laid or folded so that passages 11 are formed that extend in longitudinal direction of the filter. The alternating placement can be uniform or non-uniform. The gas to be cleaned can pass through the passages 11 and the fiber layer of the filter material 1. The gas to be cleaned thus flows preferably along the folded layers 2, 3 and not transversely thereto and, if at all, only to a minimal extent through the layers. The pressure losses are therefore minimal.

In the embodiment illustrated here, the filter is enclosed by an envelope layer 9.

In case of use of the filter 8 as a cigarette filter, the envelope layer 9 can be a simple wrapping paper that, as one piece, can surround the tobacco strand of the cigarette (not illustrated) as well as the cigarette filter. It is also possible that the envelope layer 9 only surrounds the filter 8.

The surface 10 of the filter material 1 forms the inner surface of the passages 11. Because of the depressions 5 and the optional crimping of the filter material 1 an uneven surface structure of the passages 11 is formed that has a positive effect on the filter action of the filter according to the invention.

Figure 4:
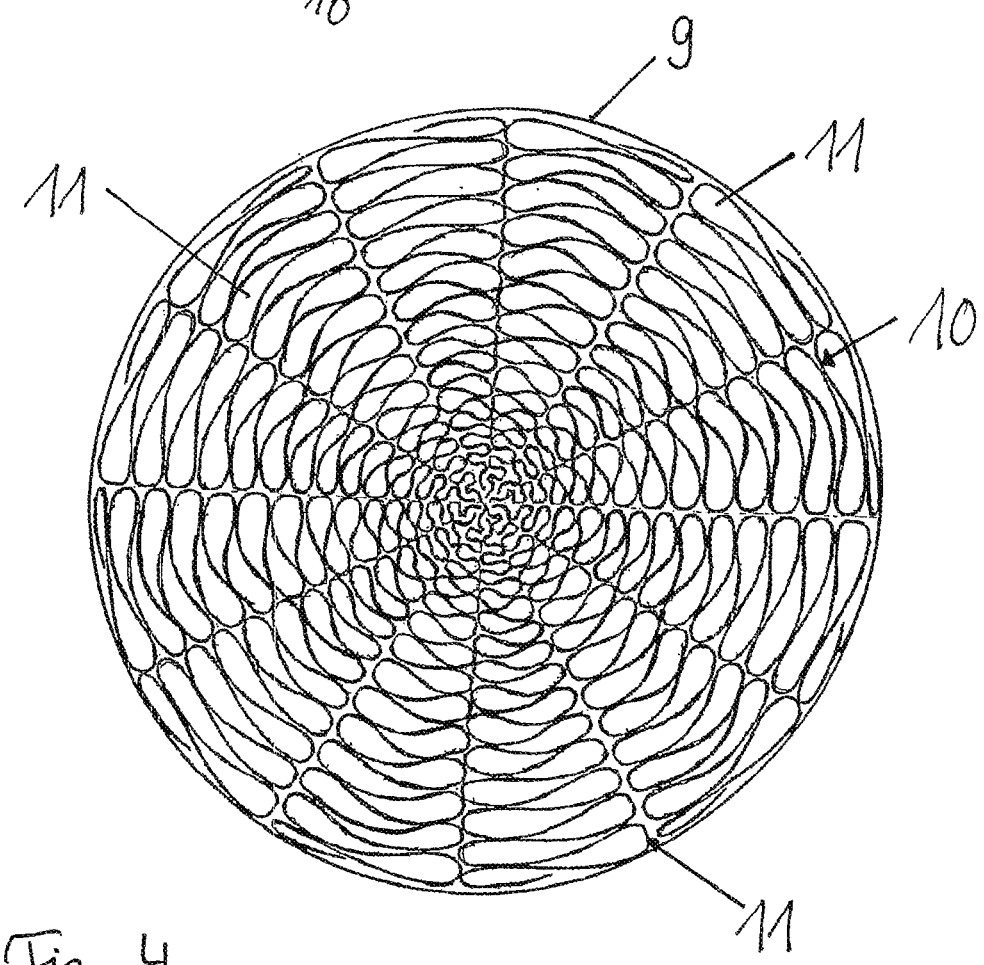
FIG. 4 a section of the filter along the section line A-A of FIG. 3.

FIG. 4 shows a section of the filter according to the invention along, the section line A-A. The filter material 1, as illustrated, is alternatingly laid so that passages 11 are formed in longitudinal direction of the filter. The alternatingly laid filter material 1 can be arranged within the filter 8 symmetrically or asymmetrically. In the embodiment illustrated here, the alternatingly laid filter material layers 1 form individual circle segments. The arrangement of the layers of filter material can also be nonuniform.

The filter material according to the invention can also be used in devices for cleaning air and gases. Laying of the filter material 1, as illustrated in the FIGS. 3 and 4, can also be done in the form of a cylinder; incidentally, the shape of the filter to be used in the device can be chosen as desired, for example, a box shape or other conceivable shapes.

LIST OF REFERENCE NUMERALS 1 filter material
2 fiber layer
3 further layer
4 embossed area
5 depressions
6 projections
7 further depressions
8 filter
9 envelope layer
10 surface of the filter material 1
11 passages

What is claimed is:

1. A filter material for cleaning air and gases, the filter material comprising:
   a fiber layer comprised exclusively of pulp fibers that, across partial areas, are connected to each other by a pressing action with compression of the pulp fibers in the compressed areas;
   wherein the fiber layer and optional further layers arranged on flat sides of the fiber layer form a fiber web, wherein the fiber web is crimped and is laid with formation of passages extending in a longitudinal direction of a gas or air stream to be cleaned.

2. The filter material according to claim 1, wherein the pulp fibers in the compressed areas are pressed with heat application.

3. The filter material according to claim 1, wherein no adhesives and no binding agents are contained.

4. The filter material according to claim 1, comprising a first further layer arranged on a first flat side of the fiber layer.

5. The filter material according to claim 4, comprising a second further layer on a second flat side, wherein the first and second further layers are of the same material or of materials that differ from each other.

6. The filter material according to claim 5, wherein the first and second further layers are selected independent from each other from tissue, textile, nonwoven, or film material.

7. The filter material according to claim 1, having a weight per surface area between 15 g/m$^2$ and 600 g/m$^2$.

8. The filter material according to claim 7, having a weight per surface area between 20 g/m² and 200 g/m².

9. The filter material according to claim 1, containing one or several additives selected from the group consisting of adsorption agents, flavor additives and auxiliary substances.

10. The filter material according to claim 9, wherein the adsorption agents are selected from the group consisting of active carbon, zeolites, silicates, and $SiO_2$.

11. A filter for cleaning gases and/or air, the filter comprising a filter material according to claim 1.

12. A cigarette filter comprising a first filter material according to claim 1.

13. The cigarette filter according to claim 12, comprising an envelope layer that envelopes the first filter material.

14. The cigarette filter according to claim 12, comprising a second filter material attached to the first filter material at an end of the cigarette filter where smoke enters the cigarette filter.

15. The cigarette filter according to claim 14, wherein the second filter material is selected from active carbon, cellulose acetate, or paper.

16. The cigarette filter according to claim 12, comprising a further material, providing a visual termination of the cigarette filter, arranged at and end of the first filter material where smoke exits the cigarette filter.

17. The cigarette filter according to claim 12, wherein after composting for a duration of at most 12 weeks maximally 10% of an original dry weight of the cigarette filter is contained in a >2 mm screening fraction.

* * * * *